United States Patent [19]

Kawasumi et al.

[11] Patent Number: 4,773,233
[45] Date of Patent: Sep. 27, 1988

[54] FREEZER MACHINE FOR MAKING ICE CREAM AND ICE CUBES

[75] Inventors: Sakichi Kawasumi; Tomio Suyama, both of Toyoake, Japan

[73] Assignee: Hoshizaki Denki Kabushiki Kaisha, Aichi, Japan

[21] Appl. No.: 114,842

[22] Filed: Oct. 30, 1987

[30] Foreign Application Priority Data

Oct. 31, 1986 [JP] Japan .................. 61-261653

[51] Int. Cl.⁴ .................. F25C 1/06; A23G 9/12
[52] U.S. Cl. .................. 62/340; 62/342; 62/68
[58] Field of Search .................. 62/68, 340, 342, 343, 62/352

[56] References Cited

U.S. PATENT DOCUMENTS

| | | | |
|---|---|---|---|
| 4,429,549 | 2/1984 | Randolphi | 62/342 |
| 4,450,692 | 5/1984 | Sharpe et al. | 62/342 X |
| 4,563,880 | 1/1986 | Cipelletti | 62/234 |
| 4,583,863 | 4/1986 | Pandolfi | 366/149 |
| 4,655,605 | 4/1987 | Cipelletti | 366/312 |
| 4,664,529 | 5/1987 | Cavalli | 366/149 |
| 4,681,458 | 7/1987 | Cavalli | 366/149 |

*Primary Examiner*—William E. Tapolcai
*Attorney, Agent, or Firm*—Parkhurst & Oliff

[57] ABSTRACT

A freezer machine wherein ice cream or ice cubes can be selectively prepared by replacement of a removable ice cream-forming container and its associated first stirring element with a removable annular multicell frame assembly and its associated second stirring element. The ice cream-forming container is coupled within a freezing vessel mounted in a box-type cabinet, and the first stirring element is settled in the container to whip the ingredients to be frozen into ice cream. The frame assembly is coupled within the freezing vessel, and the second stirring element is settled in the freezing vessel to stir the water to be frozen into ice cubes within the frame assembly.

15 Claims, 4 Drawing Sheets

FREEZER MACHINE FOR MAKING ICE CREAM AND ICE CUBES

BACKGROUND OF THE INVENTION

1. Field of the Invention

The present invention relates to a freezer machine for household use, and more particularly to a freezer machine for selectively making ice cream or similar cold products and ice cubes for domestic consumption.

2. Description of the Prior Art

There have been proposed heretofore various kinds of household ice-cream making machines and various kinds of household ice cube making machines. The conventional ice-cream naking machines, however, are designed to make only ice cream or similar cold products for household use, while the conventional ice cube making machines are designed to make only ice cubes for household use. In other words, the conventional ice-cream making machines may not be utilized to make ice cubes. For this reason, it has been considered that such ice-cream making machines for household use are uneconomical.

SUMMARY OF THE INVENTION

It is, therefore, a primary object of the present invention to provide a freezer machine capable of selectively making ice-cream or similar cold products and ice cubes or a cylindrical ice for household use.

A secondary object of the present invention is to provide a freezer machine wherein ice cream or ice cubes can be selectively prepared by replacement of a small number of component parts of the machine.

According to the present invention, the objects are attained by providing a freezer machine which comprises a box-type cabinet, a refrigerating system including a compressor, a condenser and an evaporator coil housed in the cabinet, a freezing vessel of substantially cylindrical shape supported in the cabinet in conditions for thermal exchange with the evaporator coil of the refrigerating system, a removable ice cream-forming container of substantially cylindrical shape coupled within the freezing vessel in such a manner as to define therebetween a slight interspace for storing an amount of water therein, a first removable stirring element settled in the ice cream-forming container for whipping the ingredients to be frozen in the container, a removable annular multicell frame assembly to be coupled within the freezing vessel when the ice cream-forming container has been removed for replacement therewith, the frame assembly being formed with a multiplicity of freezing cells each forming therein an ice cube when an amount of water has been stored in the freezing vessel, a second removable stirring element to be settled in the freezing vessel for stirring the water to be frozen into ice cubes in the frame assembly, and a drive mechanism for driving the first stirring element settled in the ice cream-forming container or the second stirring element settled in the freezing vessel.

BRIEF DESCRIPTION OF THE DRAWINGS

Additional objects, features and advantages of the present invention will be readily understood from the following detailed description of a preferred embodiment thereof when considered with reference to the accompanying drawings, in which.

DESCRIPTION OF THE PREFERRED EMBODIMENT

Figure 1:
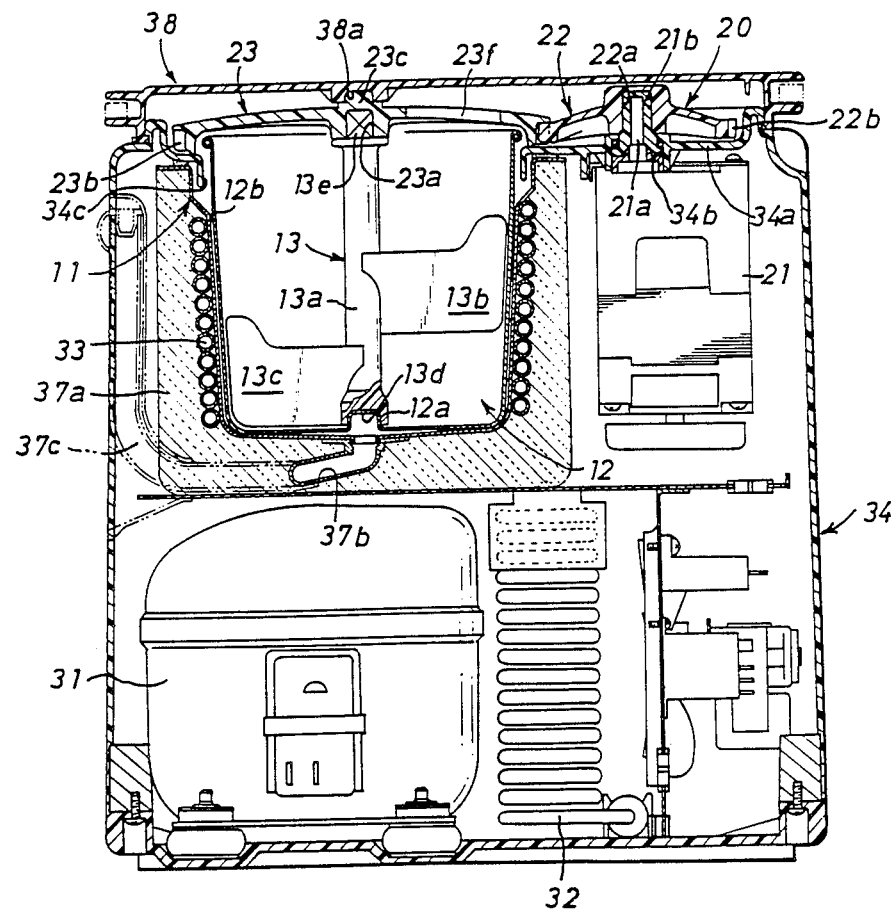
FIG. 1 is a vertical cross-sectional view of a freezer machine in accordance with the present invention.
Figure 2:
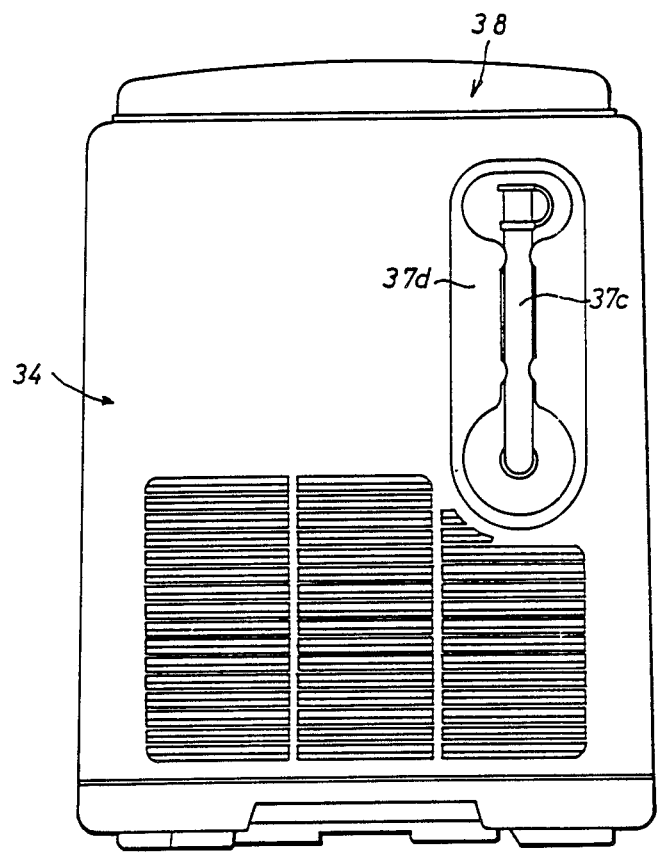
FIG. 2 is a side view of the freezer machine.

With reference to FIGS. 1 to 4, the freezer machine comprises a freezing vessel 11 of substantially cylindrical shape, a removable ice cream-forming container 12 of substantially cylindrical shape, a first removable stirring element 13, a removable annular multicell frame assembly 14 (shown in FIGS. 4 and 5), a second removable stirring element 15 (shown in FIG. 4) and a drive mechanism 20. The freezer machine further comprises a refrigerating system which includes a compressor 31, a condenser 32 and an evaporator coil 33. As shown in FIGS. 1 and 2, the component parts described above are housed in a box-type cabinet 34.

Figure 6:
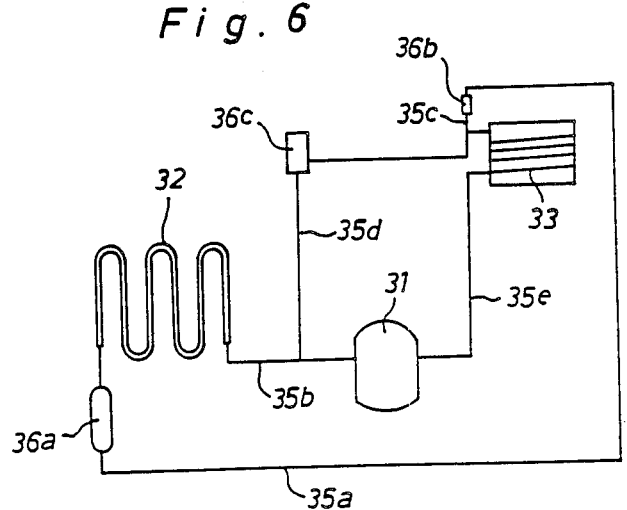
FIG. 6 is an illustration of a refrigerating system adapted to the freezer machine.

As shown in FIG. 6, the refrigerating system further includes a dryer 36a and a capillary tube 36b disposed within a conduit 35a between the condenser 32 and the evaporator coil 33, a bypass conduit 35d connected at its one end to a conduit 35b between the compressor 31 and condenser 32 and at its other end to a conduit 35c between the evaporator coil 33 and capillary tube 36b, and a solenoid valve 36c of the normally closed type disposed within the bypass conduit 35d. A conduit 35e is connected at its one end to the evaporator coil 33 and at its other end to the compressor 31. When the compressor 31 is activated under a deenergized condition of solenoid valve 36c, a refrigerating fluid circulates through the conduits 35b, 35a, 35c and 35e, in sequence. When the solenoid valve 36c is energized during activation of the compressor 31, the refrigerating fluid circulates through the conduits 35b, 35d, 35c and 35e, in sequence.

The freezing vessel 11 is surrounded by the evaporator coil 33 for thermal exchange therewith and embedded in a heat-insulative layer 37a. The freezing vessel 11 opens at the top and has a bottom formed at its center with an aperture 11a to which a drain plug 37b is fixedly attached in a fluid-tight manner. A flexible drain hose 37c of elastic material is connected at its one end to the drain plug 37b and extends outwardly from the box-type cabinet 34 through a portion of heat-insulative layer 37a. As shown in FIG. 2, the outer end portion of flexible drain hose 37c is removably supported in place by engagement with a holder 37d secured to the external side wall of cabinet 34 at a position above the aperture 11a of vessel 11.

Figure 3:
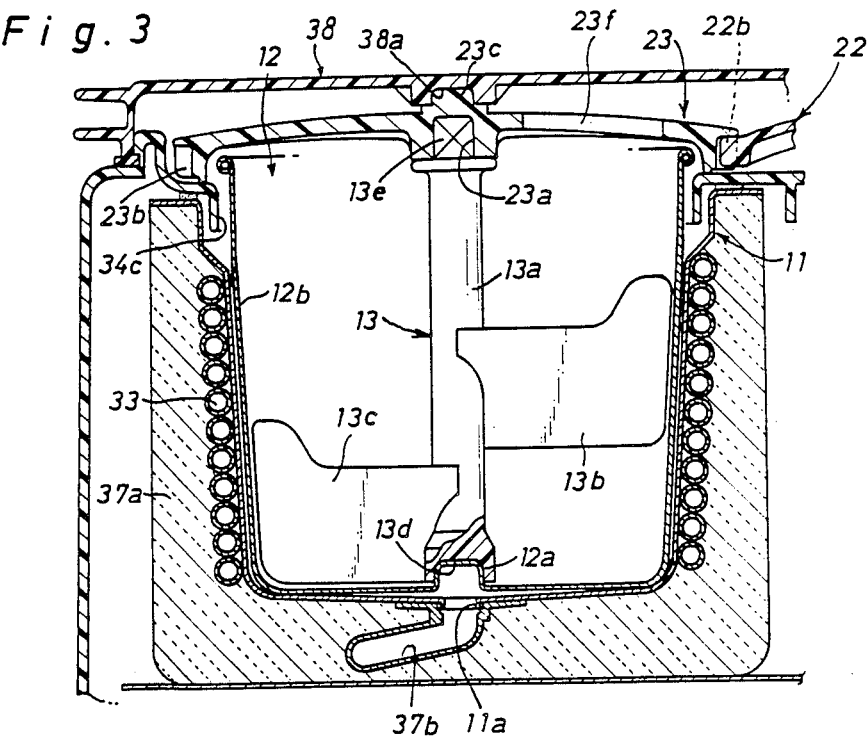
FIG. 3 is an enlarged vertical cross-sectional view of a removable ice cream-forming container coupled with a freezing vessel of the freezer machine shown in FIG. 1.

The ice cream-forming container 12 is formed substantially in the sane configuration as the freezing vessel 11 and formed smaller in diameter than the freezing vessel 11 to define a slight interspace therebetween when it has been coupled within the freezing vessel 11. The container 12 has a bottom which is formed at its center with a projection 12a. The first stirring element 13 comprises a rotary shaft 13a of synthetic resin and two blades 13b and 13c integral with the rotary shaft 13a, the lower edge of blade 13b being located substantially at the height of the upper edge of blade 13c. The upper blade 13b is inclined with respect to the rotary shaft 13a to have the function of scraping the vertical walls of the container 12 and of conveying the frozen mass upwards. Similarly, the lower blade 13c is inclined with respect to the rotary shaft 13a to have the function of scraping the vertical walls and bottom of the container 12 and of conveying the frozen mass upwards. The rotary shaft 13a is formed at its lower end with a cylindrical recess 13d which is rotatably coupled with the bottom projection 11a of container 12. The rotary shaft 13a has an upper end 13e of rectangular cross-section which is coupled with a corresponding recess 23a in a driven gear 23 of large diameter of the drive mechanism 20. When settled in the container 12, the rotary shaft 13a of stirring element 13 is positioned in place by engagement with the bottom projection 12a of container 12 at its lower end recess 13d and engagement with the recess 23a of gear 23 at its upper end 13e. Thus, the blades 13b and 13c of stirring element 13 are positioned to scrape the vertical walls and bottom of container 12 as shown in FIGS. 1 and 3.

Figure 4:
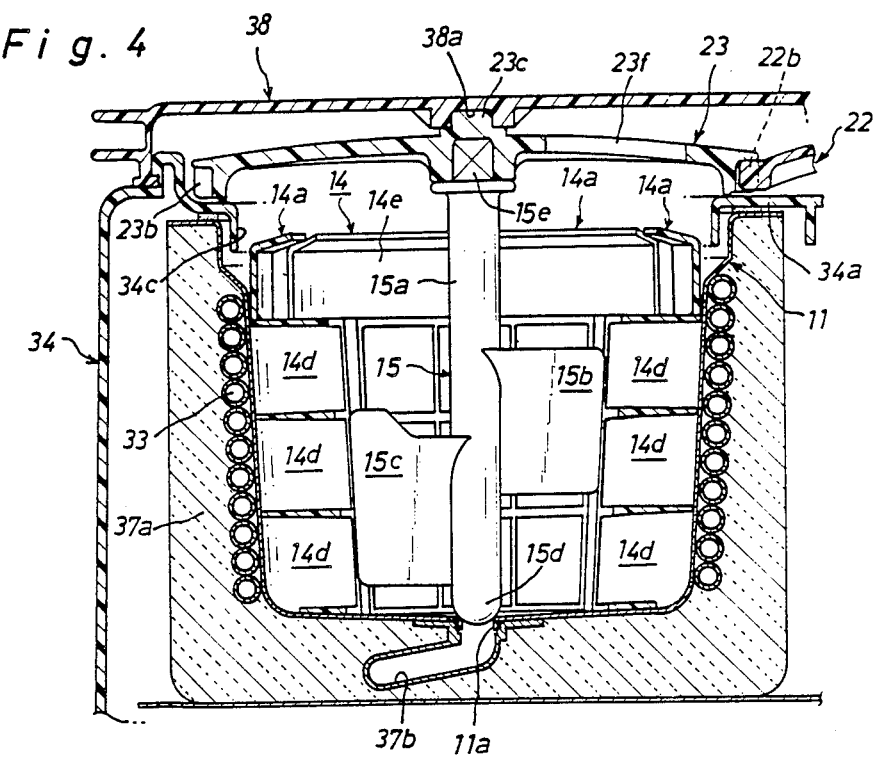
FIG. 4 is an enlarged vertical cross-sectional view of a removable annular multicell frame assembly coupled within the freezing vessel of the freezer machine.
Figure 5:
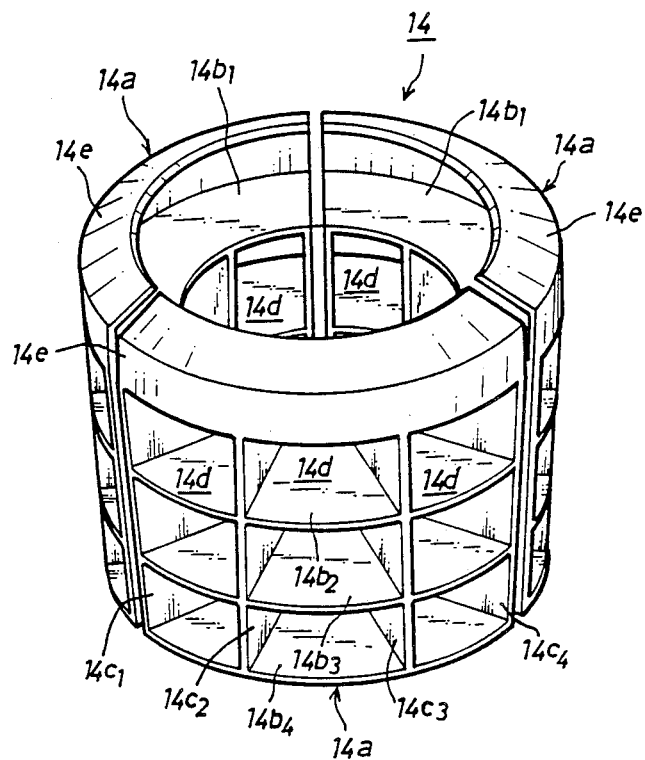
FIG. 5 is a perspective view of the multicell frame assembly shown in FIG. 4.

As shown in FIGS. 4 and 5, the removable annular multicell frame assembly 14 is composed of three semi-cylindrical frame elements 14a which are equally divided in a circumferential direction. The semi-cylindrical frame elements 14a each are composed of four vertically equi-spaced semi-circular partition walls $14b_1$–$14b_4$ and four circumferentially equi-spaced vertical partition walls $14c_1$–$14c_4$ which are integrally connected with the semi-circular partition walls to form a multiplicity of freezing cells 14d in the frame element 14a. The freezing cells 14d are tapered to open radially outwardly so as to facilitate the release of ice cubes frozen therein. When the frame elements 14a are coupled within the freezing vessel 11, they are unitedly assembled to provide the multicell frame assembly 14 for formation of ice cubes in the freezing vessel 11. After the formation of ice cubes, the frame elements 14a can be separately removed from the freezing vessel 11 in such a manner as will be described later. To facilitate removal of the respective frame elements 14a from the freezing vessel 11, a semi-circular grip 14e is integrally formed on each uppermost portion of the frame elements 14a.

The second stirring element 15 comprises a rotary shaft 15a of synthetic resin and two blades 15b and 15c integral with the rotary shaft 15a. The blades 15b and 15c are inclined with respect to the rotary shaft 15a to have the function of scraping the internal edges of the frame elements 14a and of conveying upwards the water to be frozen into ice cubes in the freezing cells 14d. The rotary shaft 15a has a lower end 15d rotatably supported in place by engagement with the bottom aperture 11a of freezing vessel 11 and has an upper end 15e of rectangular cross-section which is formed in the same configuration as the upper end 13e of rotary shaft 13 to be coupled with the corresponding recess 23a in the driven gear 23 of the drive mechanism 20. When settled in the freezing vessel 11, the rotary shaft 15a of stirring element 15 is positioned in place by engagement with the bottom aperture 11a of vessel 11 at its lower end 15d and engagement with the recess 23a of driven gear 23 at its upper end 15e. Thus, the blades 15b and 15c of stirring element 15 are positioned to scrape the internal edges of frame elements 14a as shown in FIG. 4.

As shown in FIG. 1, the drive mechanism 20 includes an electric motor 21, a drive gear 22 of small diameter and the driven gear 23 of large diameter. The electric motor 21 is housed in the cabinet 34 at one side of the heat-insulative layer 37a for freezing vessel 11 and mounted on an upper plate 34a of cabinet 34. The motor 21 has an output shaft 21a which protrudes upwards from a hole 34b of small diameter provided in the upper plate 34a. An adapter 21b is coupled over the output shaft 21a of motor 21 for rotation therewith and is rotatably coupled within a stepped portion of the hole 34b. The adapter 21b has a head portion of rectangular cross-section which protrudes upwards from the hole 34b to carry the drive gear 22 thereon. The drive gear 22 is formed at its hub portion with a recess 22a of rectangular cross-section which is removably coupled with the head portion of adapter 21b for rotation therewith. The driven gear 23 of large diameter is formed at its hub portion with the recess 13a which is removably coupled with the upper end 13e of the first stirring element 13 or the upper end 15e of the second stirring element 15, as described above. When the driven gear 23 is coupled at its recess 23a with the upper end 13e of the first stirring element 13 or the upper end 15e of the second stirring element 15, as shown in FIGS. 3 and 4, the teeth 23b of driven gear 23 are brought into meshing engagement with the teeth 22b of drive gear 22 to be driven by the electric motor 21.

In the freezer machine, the driven gear 23 is further formed at its body portion with a plurality of circumferentially equi-spaced openings 23f and at its outer periphery with an annular flange which is designed to cover the meshed portion of gears 22 and 23. A transparent lid 38 of hard synthetic resin is removably coupled over an outer peripheral rim of upper plate 34a of cabinet 34. The lid 38 is formed at its internal wall with a cylindrical recess 38a which is rotatably coupled with a central projection 23c of driven gear 23 when the lid 38 has been coupled over the upper plate 34a of cabinet 34. The coupling of the lid 38 with the central projection 23c of driven gear 23 is useful to position the driven gear 23 and the stirring element 13 or 15 in place.

In use of the freezer machine, ice cream or ice cubes can be selectively prepared by replacement of the ice cream-forming container 12 and its associated first stirring element 13 with the multicell frame assembly 14 and its associated second stirring element 15, as will be described hereinafter. When it is desired to prepare ice cream, a small amount of water necessary for filling the interspace between the freezing vessel 11 and the ice cream-forming container 12 is introduced into the freezing vessel 11 in a condition where the outer and portion of drain hose 37c is supported in place by engagement with the holder 37d. On the other hand, a desired amount of ingredients to be frozen into ice cream is prepared in the ice cream-forming container 12. Thereafter, the ice cream-forming container 12 is coupled within the freezing vessel 11 such that the container 12 is substantially immersed in the water stored within the vessel 11. Subsequently, the drive gear 22 is coupled with the adapter 21b of electric motor 21, while the rotary shaft 13a of the first stirring element 13 is coupled at its upper end 13e with the recess 23a of driven gear 23 and at its lower end recess 13d with the bottom projection 12a of container 12. Thus, the first stirring element 13 is settled in place in the container 12, and the driven gear 23 is brought into meshing engagement with the drive gear 22. Finally, the lid 38 is fixedly coupled over the upper plate 34a of cabinet 34 in such a manner that it is coupled at its recess 38a with the central projection 23c of driven gear 23.

After the freezer machine has been set in such a manner as described above, the electric motor 21 and compressor 31 are activated by the electric power supplied thereto and maintained in their activated conditions for a predetermined period of time. This causes the refrigerating fluid to circulate through the conduits 35b, 35a, 35c and 35e shown in FIG. 6 and causes the stirring element 13 to rotate in the ice cream-forming container 12. Thus, the freezing vessel 11 is first cooled by thermal exchange with the evaporator coil 33 to freeze the water in the interspace between vessel 11 and container 12, while the ingredients to be frozen are whipped by rotation of the stirring element 13. In this instance, the film of frozen ice between vessel 11 and container 12 is useful to prevent rotation of the container 12 with the stirring element 13 and to ensure good cold transmission from the evaporator coil 33 to the container 12.

In the course of formation of ice cream, the blades of stirring element 13 act to scrape frozen scales on the container walls and to convey the ingredients upwards. When the formation of ice cream is completed upon lapse of the predetermined period of time, the electric motor 21 is deactivated, and the solenoid valve 36c is energized for a short period of time to open the bypass conduit 35d thereby to permit circulation of the refrigerating fluid through the conduits 35b, 35d, 35c and 35e shown in FIG. 6. As a result, the hot gas outflowing from the compressor 31 is supplied into the evaporator coil 33 through the bypass conduit 35d to dissolve the film of frozen ice between vessel 11 and container 12. Thereafter, the electric power supply to the compressor 31 and solenoid valve 36c is cut off, the lid 38 is removed from the cabinet 34, and the driven gear 23 is removed with the stirring element 13 from the container 12. Thus, the container 12 can be removed from the freezing vessel 11 without any trouble to take out the prepared ice cream therefrom. To discharge the water from the vessel 11, the outer end portion of drain hose 37c is removed from the holder 37d and directed downwards in an appropriate drain tub.

When it is desired to make ice cubes, the frame elements 14a are assembled in the form of the annular multicell frame assembly 14 in the freezing vessel 11, as shown in FIG. 5, and the second stirring element 15 is settled in the freezing vessel 11 in the same manner as described above. In this instance, as shown in FIG. 4, the rotary shaft 15a of stirring element 15 is positioned in place by engagement with the bottom aperture 11a of vessel 11 at its lower end 15d and engagement with the recess 23a of driven gear 23 at its upper end 15e. Thereafter, a desired amount of water is introduced into the freezing vessel 11 through one of the openings 23f of driven gear 23 in a condition where the outer end portion of drain hose 37c has been supported in place by engagement with the holder 37d, and the lid 38 is fixedly coupled over the upper plate 34a of cabinet 34 to position the driven gear 23 and the stirring element 15 in place.

After the freezer machine has been set in the manner described above, the electric motor 21 and compressor 31 are activated by the electric power supplied thereto and maintained in their activated conditions for a predetermined period of time. This causes the refrigerating fluid to circulate through the conduits 35b, 35a, 35c and 35e shown in FIG. 6 and causes the stirring element 15 to rotate within the multicell frame assembly 14. Thus, the freezing vessel 11 is first cooled by thermal exchange with the evaporator coil 33 to freeze the water stored therein, while the water to be frozen is stirred by rotation of the stirring element 15. When the temperature of freezing vessel 11 decreases sufficiently below the freezing point of water, transparent ice gradually forms at each outside of the freezing cells 14d and builds up radially inwardly along the partition walls of frame assembly 14 to gradually fill the interior of freezing cells 14d. When the formation of ice cubes in the freezing cells 14d is completed upon lapse of the predetermined period of time, the electric motor 21 is deactivated, and the solenoid valve 36c is energized for a short period of time to open the bypass conduit 35d thereby to permit circulation of the refrigerating fluid through the conduits 35b, 35d, 35c and 35e shown in FIG. 6. As a result, the hot gas outflowing from the compressor 31 is supplied into the evaporator coil 33 through the bypass conduit 35d to dissolve the film of frozen ice formed on the internal surfaces of freezing vessel 11. Thereafter, the electric power supply to the compressor 31 and solenoid valve 36c is cut off, the lid 38 is removed from the cabinet 34, and the driven gear 23 is removed with the stirring element 15 from the freezing vessel 11. Thus, the multicell frame assembly 14 can be removed from the freezing vessel 11 without any trouble, and divided into the respective frame elements 14a. When the frame element 14a is twisted at its opposite ends in a reverse direction, ice cubes in the freezing cells can be released for use. If desired, ice cubes in the frame element 14a may be stored as it is in the freezer box of a refrigerator.

When it is desired to prepared a cylindrical ice, only the second stirring element 15 is settled in the freezing vessel 11 in the same manner as described above. In this instance, as shown in FIG. 4, the rotary shaft 15a of stirring element 15 is positioned in place by engagement with the bottom aperture 11a of vessel 11 at its lower end 15d and engagement with the recess 23a of driven gear 23 at its upper end 15e. Thereafter, a desired amount of water is introduced into the freezing vessel 11 through one of the openings 23f of driven gear 23 in a condition where the outer end portion of drain hose 37c has been supported in place by engagement with the holder 37d, and the lid 38 is fixedly coupled over the upper plate 34a of cabinet 34 to position the driven gear 23 and the stirring element 15 in place.

After the freezer machine has been set in the manner described above, the electric motor 21 and compressor 31 are activated by the electric power supplied thereto and maintained in their activated conditions for a predetermined period of time. This causes the refrigerating fluid to circulate through the conduits 35b, 35a, 35c and 35e shown in FIG. 6 and causes the stirring element 15 to rotate within the freezing vessel 11. Thus, the freezing vessel 11 is first cooled by thermal exchange with the evaporator coil 33 to freeze the water stored therein, while the water to be frozen into a cylindrical ice is stirred by rotation of the stirring element 15. When the temperature of freezing vessel 11 decreases sufficiently below the freezing point of water, transparent ice gradually forms on the internal surfaces of freezing vessel 11 and builds up radially inwardly to be gradually formed in a cylindrical ice. When the formation of the cylindrical ice in vessel 11 is completed upon lapse of the predetermined period of time, the electric motor 21 is deactivated, and the solenoid valve 36c is energized for a short period of time to open the bypass conduit 35d thereby to permit circulation of the refrigerating fluid through the conduits 35b, 35d, 35c and 35e. As a result, the hot gas outflowing from the compressor 31 is supplied into the evaporator coil 33 through the bypass conduit 35d to dissolve the outer periphery of the cylindrical ice formed in vessel 11. Thereafter, the electric power supply to the compressor 31 and solenoid valve 36c is cut off, the lid 38 is removed from the cabinet 34, and the driven gear 23 is removed with the stirring element 15 from the freezing vessel 11. Thus, the cylindrical ice can be removed from the freezing vessel 11 without any trouble.

From the above description, it will be understood that the freezer machine is useful to selectively prepare ice cream or similar cold products and ice cubes or a cylindrical ice only by replacement of the ice cream-forming container 12 and its associated stirring element 13 with the annular multicell frame assembly 14 and its associated stirring element 15.

Having now fully set forth a preferred embodiment of the concept underlying the present invention, various modifications and variations of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A freezer machine for selectively making ice cream or similar produce and ice cubes, comprising:
    a box-type cabinet;
    a refrigerating system including a compressor, a condenser and an evaporator coil housed in said cabinet;
    a freezing vessel of substantially cylindrical shape supported in said cabinet in conditions for thermal exchange with the evaporator coil of said refrigerating system;
    a removable ice cream-forming container of substantially cylindrical shape coupled within said freezing vessel in such a manner as to define therebetween a slight interspace for storing an amount of water therein;
    a first removable stirring element settled in said ice cream-forming container for whipping the ingredients to be frozen into ice cream or similar products in said container;
    a removable annular multicell frame assembly to be coupled within said freezing vessel when said ice cream-forming container has been removed for replacement therewith, said frame assembly being formed with a multiplicity of freezing cells each forming therein an ice cube when an amount of water has been stored in said freezing vessel;
    a second removable stirring element to be settled in said freezing vessel for stirring the water to be frozen into ice cubes in said frame assembly; and
    a drive mechanism for alternatively driving said first stirring element settled in said ice cream-forming container or said second stirring element settled in said freezing vessel.

2. A freezer machine as claimed in claim 1, wherein said annular multicell frame assembly comprises a plurality of semi-cylindrical frame elements each composed of a plurality of vertically spaced semi-circular partition walls and a plurality of circumferentially spaced vertical partition walls which are integrally connected with the semi-circular partition walls to form said multiplicity of freezing cells in said frame element.

3. A freezer machine as claimed in claim 2, wherein the vertical partition walls of said respective frame elements are arranged in such a manner that said freezing cells are tapered to open radially outwardly.

4. A freezer machine as claimed in claim 2, wherein a semi-circular grip is integrally formed on each uppermost portion of said frame elements.

5. A freezer machine as claimed in claim 1, wherein said freezing vessel has a bottom which is formed at its center with an aperture to which a drain plug is attached in a fluid tight manner, and wherein a flexible drain hose of elastic material is connected at one end thereof to said drain plug and extends outwardly from said cabinet, another end portion of said hose being removably supported in place by engagement with a holder secured to an external side wall of said cabinet at a position above the bottom aperture of said vessel.

6. A freezer machine as claimed in claim 1, wherein a drive mechanism comprises an electric motor mounted in said cabinet at one side of said freezing vessel and having an output shaft protruding therefrom upwards through an upper plate of said cabinet, a drive gear of small diameter removably coupled with the output shaft of said motor for rotation therewith, a driven gear of large diameter removably coupled with said first or second stirring element for rotation therewith and meshed with said drive gear.

7. A freezer machine as claimed in claim 6, wherein said driven gear is integrally form at its outer periphery with an annular flange which is designed to cover the meshed portion of said gears.

8. A freezer machine as claimed in claim 6, wherein said driven gear has a body portion formed with a plurality of circumferentially spaced openings.

9. A freezer machine as claimed in claim 6, wherein a lid is coupled over an outer peripheral rim of the upper plate of said cabinet, said lid being formed at an internal wall with a pivot portion which is rotatably coupled with the center of said driven gear to position said driven gear in place.

10. A freezer machine as claimed in claim 6, wherein said first stirring element comprises a rotary shaft and one or more blades integral with said rotary shaft, said rotary shaft having an upper end removably coupled with a hub of said driven gear for rotation therewith and a lower end rotatably supported on a bottom of said ice cream-forming container.

11. A freezer machine as claimed in claim 10, wherein the bottom of said ice cream-forming container is formed at its center with a projection, and wherein the lower end of said rotary shaft is formed with a cylindrical recess rotatably coupled with the bottom projection of said container.

12. A freezer machine as claimed in claim 6, wherein said second stirring element comprises a rotary shaft and one or more blades integral with said rotary shaft, said rotary shaft having an upper end removably coupled with a hub of said driven gear for rotation therewith and a lower end rotatably supported on a bottom of said freezing vessel.

13. A freezer machine as claimed in claim 12, wherein the bottom of said freezing vessel is formed at its center with an aperture for discharging the water from the interspace between said vessel and said container, and wherein the lower end of said rotary shaft is rotatably coupled with the bottom aperture of said freezing vessel.

14. A freezer machine for selectively making ice cream or similar cold products and a cylindrical ice, comprising;
   a box-type cabinet;
   a refrigerating system including a compressor, a condenser, and an evaporator coil housed in said cabinet;
   a freezing vessel of substantially cylindrical shape supported in said cabinet in conditions for thermal exchange with the evaporator coil of said refrigerating system;
   a removable ice cream-forming container of substantially cylindrical shape coupled with said freezing vessel in such a manner as to define therebetween a slight interspace for storing an amount of water therein;
   a first removable stirring element settled in said ice cream-forming container for whipping the ingredients to be frozen into ice cream in said container;
   a second removable stirring element to be settled in said freezing vessel for stirring the water to be frozen into a cylindrical ice in said vessel; and
   a drive mechanism for alternatively driving said first stirring element settled in said ice cream-forming container or said second stirring element settled in said freezing vessel.

15. A freezer machine as claimed in claim 14, wherein said drive mechanism comprises an electric motor mounted in said cabinet at one side of said freezing vessel and having an output shaft protruding therefrom upwards through an upper plate of said cabinet, a drive gear of small diameter removably coupled with the output shaft of said motor, a driven gear of large diameter alternatively coupled with said first or second stirring element for rotation therewith and meshed with said drive gear.

* * * * *